Oct. 18, 1949.    N. M. SAMUEL    2,484,963
COOKING UTENSIL
Filed Feb. 15, 1945
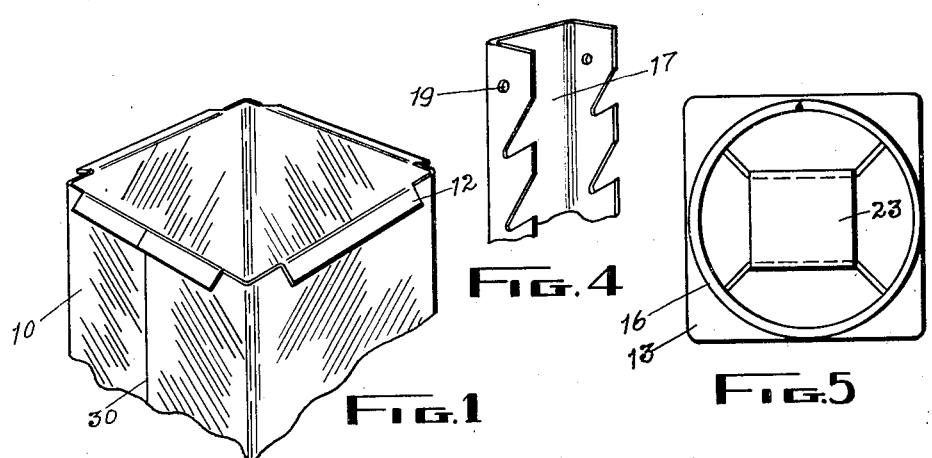
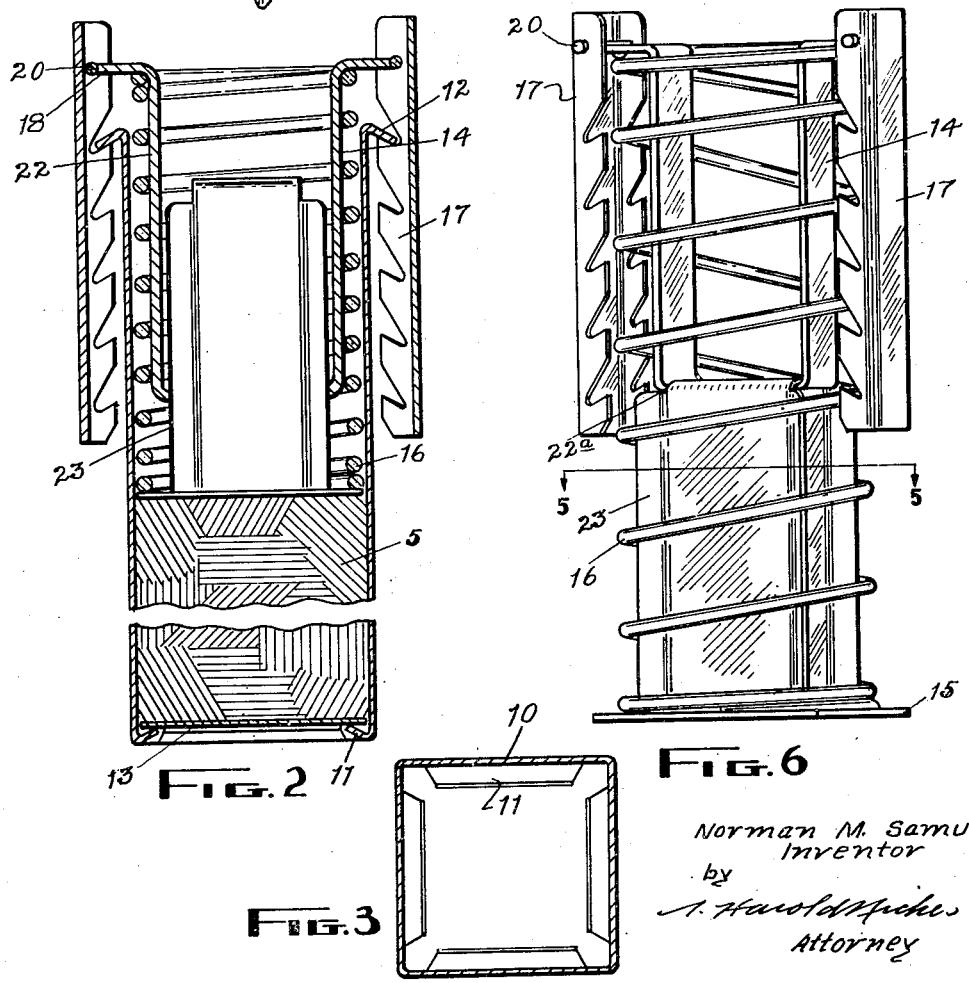
Norman M. Samuel
Inventor
by
A. Harold Michels
Attorney Patented Oct. 18, 1949

2,484,963

UNITED STATES PATENT OFFICE 2,484,963

COOKING UTENSIL

Norman Mandelson Samuel, Ottawa, Ontario, Canada

Application February 15, 1945, Serial No. 577,998

2 Claims. (Cl. 99—351)

This invention relates to a cooking utensil and is particularly directed to providing a utensil in which food products can be moulded or pressed into a desired shape during the cooking operation.

Cooking utensils of the type in which the product is moulded or pressed into a desired shape during cooking are well known and widely used, particularly in the simultaneous cooking and pressing of meats, such as hams.

One of the primary objects of this invention is to provide a cooking utensil in which a food, such as meat, is pressed into a desired shape during cooking and from which the cooked product can be ejected by extrusion without damage to the moulded shape.

A further and important object of the invention is to provide a utensil which serves to produce a product of uniform shape and density regardless of shrinkage and other changes which may take place during cooking.

A further object of the invention is to provide a cooking utensil which is inexpensive to manufacture, of few component parts, easily assembled, and which can be readily kept clean and sanitary.

A still further object of this invention is to provide a utensil which will from time to time contain meats of various sizes and which will, during the cooking process, press them into loaves of various lengths but always with squared ends and of uniform cross sections and of relatively uniform density throughout each length.

The cooking utensil of the present invention comprises, in general, a casing having at least one open end and a pressing assembly fittable into the open end, said pressing assembly comprising a cover plate snugly fittable into the casing, spring means between the cover plate and the open end and fittable snugly between the walls of the casing and in contact with the cover plate adjacent to the periphery thereof, and means for maintaining said spring at all times in substantially axial alignment with said casing, whereby said cover plate is maintained in a position substantially at right angles to said casing.

An understanding of the manner in which the above and other objects of the invention are attained may be had from the following description, reference being made to the accompanying drawings, in which:

Figure 1 is a perspective view of the upper end of the casing;

Figure 2 is a side elevation, in section, of a cooking utensil incorporating the improvements of the present invention;

Figure 3 is a view of the bottom of the casing;

Figure 4 is a perspective view of one of the ratchets;

Figure 5 is a view taken along the line 5—5 of Figure 6; and

Figure 6 is a perspective view of the pressing assembly.

Like reference characters refer to like parts throughout the specification and drawings.

Referring to the drawings, the numeral 10 indicates a tubular casing having open ends and formed of sheet metal either seamless or with a welded seam 30. This casing can be of any desired section, such as square with rounded corners, which is preferred, circular, rectangular, or polyangular, depending upon the shape desired in the cooked and moulded product. The casing is formed, preferably, of material such as stainless steel which is easily kept clean, which is capable of withstanding the pressures to which it is subjected, and which is not affected by the corrosive or erosive effects of the cooking medium. One end of the casing, hereinafter referred to as the base, is preferably formed with inturned flanges 11 and the other end, referred to as the top, is preferably formed with outwardly turned flanges 12. These flanges serve a dual purpose in that they serve to stiffen the casing against deformation while the flanges 11 serve to support the removable closure member 13, hereinafter referred to as the base plate and the outturned flanges 12 serve as catches for the ratchets forming part of the pressing assembly.

The end closure member, or base plate 13 for the base of the casing is of a size and shape similar to that of the casing, being adapted to fit easily within the walls of the casing, and being supported on the inturned flanges 11. In the preferred arrangement, this base plate is removable by passing through the casing to the opposite open end.

The arrangement for closing the upper end of the casing and for applying pressure to the contents thereof comprises a closure member 15, hereinafter referred to as the cover plate, a telescopic frame formed by a U-shaped frame 14, and an inverted U-shaped frame 23 looped over the frame 14, a spring 16 and ratchet members 17.

The U-shaped frame 14 is adapted to fit into the interior of the casing 10, with the open end of the frame at or adjacent to the open end of the casing. The frame 14 is formed with outturned ends 18 adapted to extend over the sides of the casing, side members 22 which extend into the casing, and cross piece 22a which joins the side members.

The inverted U-shaped frame 23 is looped over the frame 14 with the open end extending into the casing 10. The walls of the frame are preferably flared, as illustrated in Figure 3, to increase the rigidity of the structure. The cover plate 15 is preferably secured to the open end of frame 23, such as by welding, and is of a size and configuration such that it fits snugly into the casing 10 without excessive clearance.

The spring 16 is preferably in the form of a helix surrounding the sides of the frames 14 and 23, being positioned in snug fitting relationship without excessive clearance between the frames and the interior walls of the casing. One end of the spring is positioned to press upwardly against the undersurface of, but unattached to, the outturned ends 18 and the other end is positioned to press downwardly against, but is unattached to, the closure member 15 adjacent to the periphery thereof. The spring is loosely coiled around the frames and while at no point affixed to any of the other component parts, it rests so closely within the casing and so closely about the frames as to hold the frames squarely in substantially axial alignment with the casing. When in position in the casing, the lower end of the spring 16 is maintained in contact with the end closure member 15 to align it and compress it with a sliding fit against the product 5.

Pins 20 are provided on the outturned ends 18 by means of which the upper ends of the ratchet members 17 are pivotably secured thereto. The upper ends of the ratchets are drilled, as indicated by the numeral 19, to engage the pins and are formed with angularly disposed teeth 21 which are adapted to engage the outturned flanges 12.

In assembling the utensil, the end closure member 13 is inserted from the upper end of the casing to rest on the inturned flanges 11, thereby closing the base of the casing. The food 5 to be cooked and moulded, such as a ham or other meat, as illustrated in Figure 2, is then inserted into the casing and the pressing assembly is inserted with the upper closure member 15 in contact with the contents of the casing and the ratchet members extending exteriorly thereof. The contents of the casing are then compressed and moulded by compressing the spring 16. When the desired pressure has been obtained, the frame 14 is locked in place by engaging the teeth of the ratchets in the edges of the outturned flanges adjacent thereto after which the assembly is ready for the cooking process. During the cooking process, the cover plate 15, squarely aligned at substantially right angles to the casing under pressure of the spring 16, is movable in the casing under the opposing pressures of the spring and the product being processed and maintains a steady and continuous pressure equally distributed over the exposed end surfaces of the product.

When the cooking process has been completed, the pressing assembly is disengaged by releasing the ratchets and the cooked and moulded contents of the casing can be easily extruded from the casing without damage to the shape by applying pressure against the end closure member 13 to push that member through the casing.

The present invention has many advantages. It can be manufactured relatively cheaply of readily available material. The component parts are few in number and simple in form. It is easily cleaned. The pressure exerted on the food during the cooking moulds it into a firm shape and, due to the self-aligning action of the pressing assembly, the moulded product is of substantially desired dimensions, squared shape, and of uniform density throughout. Also, due to the arrangement of the base closure member, the moulded product is not damaged during ejection from the mould.

It will be understood, of course, that modifications may be made in the preferred embodiment of the invention described and illustrated herein without departing from the scope of the invention as defined by the appended claims.

What I claim as new and desire to protect by Letters Patent of the United States is:

1. A cooking utensil comprising a casing having at least one open end and a pressing assembly fittable into the open end comprising a U-shaped frame having outturned ends extending over the rim of the casing, an inverted U-shaped frame looped over the closed end of said first mentioned frame and having its open end extending into the casing, a cover plate snugly fittable into the casing adjacent to the open end of the inverted U-shaped frame, a spring enclosing said U-shaped frames and positioned between the outturned ends of the first mentioned U-shaped frame and the cover plate and fittable into the casing adjacent to the interior walls thereof to contact the cover plate adjacent to the periphery thereof, and means connected to the outturned ends of said first mentioned U-shaped frame exterior of said casing for locking said spring under compression.

2. A cooking utensil comprising a casing having at least one open end, a pressing assembly fittable into the open end and comprising a U-shaped frame having outturned ends extending over the rim of the casing, and an inverted U-shaped frame looped over the closed end of said first mentioned frame and having its open end extending into the casing, and a cover plate snugly fittable into the casing and secured to the open end of the inverted U-shaped frame, a spring enclosing said U-shaped frames positioned between the outturned ends of the first mentioned U-shaped frame and the cover plate and fittable into the casing adjacent to the interior walls thereof to contact the cover plate adjacent to the periphery thereof, said U-shaped frames being effective for maintaining said spring at all times in substantially axial alignment with said casing, and ratchet means carried by the outturned ends of the first mentioned U-shaped frame adapted to act on the outturned ends to compress said spring and having teeth adapted to engage outturned flanges at the adjacent end of said casing for locking the pressing assembly in position against opposing forces.

NORMAN MANDELSON SAMUEL.

REFERENCES CITED

The following references are of record in the file of this patent:

UNITED STATES PATENTS

| Number | Name | Date |
|---|---|---|
| 1,079,160 | Briggs | Nov. 18, 1913 |
| 1,165,223 | Butz | Dec. 21, 1915 |
| 1,239,652 | Wickham | Sept. 11, 1917 |
| 1,560,066 | Lippert | Nov. 3, 1925 |
| 1,770,431 | Rispel et al. | July 15, 1930 |
| 1,835,628 | Bellinghausen | Dec. 8, 1931 |
| 1,950,763 | Walter | Mar. 13, 1934 |
| 2,037,892 | Gleason | Apr. 21, 1936 |

FOREIGN PATENTS

| Number | Country | Date |
|---|---|---|
| 237,082 | Great Britain | July 23, 1925 |